US008707163B2

(12) United States Patent
Boudville (10) Patent No.: US 8,707,163 B2
(45) Date of Patent: Apr. 22, 2014

(54) TRANSMITTING AND RECEIVING DATA VIA BARCODES THROUGH A CELLPHONE FOR PRIVACY AND ANONYMITY

(76) Inventor: Wesley John Boudville, Perth (AU)

( * ) Notice: Subject to any disclaimer, the term of this patent is extended or adjusted under 35 U.S.C. 154(b) by 49 days.

(21) Appl. No.: 13/200,849

(22) Filed: Oct. 4, 2011

(65) Prior Publication Data

US 2013/0086465 A1 Apr. 4, 2013

(51) Int. Cl.
*G06F 17/21* (2006.01)

(52) U.S. Cl.
USPC ............ 715/234; 715/238; 715/239; 715/242

(58) Field of Classification Search
None
See application file for complete search history.

(56) References Cited

U.S. PATENT DOCUMENTS

| | | | | |
|---|---|---|---|---|
| 4,728,783 A * | 3/1988 | Brass et al. | .................. | 235/456 |
| 5,930,767 A * | 7/1999 | Reber et al. | ................. | 705/26.41 |
| 5,996,893 A * | 12/1999 | Soscia | ..................... | 235/462.01 |
| 6,131,067 A * | 10/2000 | Girerd et al. | .................. | 701/470 |
| 6,394,352 B1 * | 5/2002 | De Renzis | ................ | 235/462.12 |
| 6,641,037 B2 * | 11/2003 | Williams | ..................... | 235/383 |
| 6,714,969 B1 * | 3/2004 | Klein et al. | ..................... | 709/219 |
| 6,726,104 B2 * | 4/2004 | Schuessler et al. | ...... | 235/462.09 |
| 6,965,900 B2 * | 11/2005 | Srinivasa et al. | ........................ | 1/1 |
| 7,121,466 B2 * | 10/2006 | Charbonneau | ............ | 235/462.01 |
| 7,174,031 B2 * | 2/2007 | Rhoads et al. | ................. | 382/107 |
| 7,290,740 B2 * | 11/2007 | Joy et al. | ..................... | 248/187.1 |
| 7,483,061 B2 * | 1/2009 | Fredlund et al. | ............ | 348/231.4 |
| 7,490,134 B2 * | 2/2009 | Ono et al. | ..................... | 709/217 |
| 7,613,634 B2 * | 11/2009 | Siegel et al. | ................ | 705/26.62 |
| 7,756,526 B2 | 7/2010 | Silverbrook | | |
| 7,798,417 B2 | 9/2010 | Snyder | | |
| 7,818,215 B2 | 10/2010 | King | | |
| 7,963,446 B2 * | 6/2011 | Harris | ..................... | 235/462.01 |
| 2002/0015057 A1 * | 2/2002 | Park | .............................. | 345/738 |
| 2002/0179709 A1 * | 12/2002 | Mehler | ......................... | 235/454 |
| 2003/0095135 A1 * | 5/2003 | Kaasila et al. | ................. | 345/613 |
| 2003/0184797 A1 * | 10/2003 | Hiramoto | ..................... | 358/1.15 |
| 2005/0004844 A1 * | 1/2005 | Attia | ............................... | 705/26 |
| 2007/0138270 A1 * | 6/2007 | Reblin | ........................... | 235/383 |
| 2009/0196456 A1 * | 8/2009 | Bisti et al. | ..................... | 382/100 |
| 2010/0107092 A1 * | 4/2010 | Kindberg | ...................... | 715/760 |
| 2010/0159965 A1 * | 6/2010 | Pascal et al. | .................. | 455/466 |
| 2010/0169651 A1 * | 7/2010 | Scheidt | .......................... | 713/176 |

(Continued)

OTHER PUBLICATIONS

Amit Agarwal; Browse the Web Faster on a Slow Internet Connection; Mar. 27, 2009; Digital Inspiration tech a la carte; pp. 1-2.*

(Continued)

*Primary Examiner* — Andrew Dyer
(74) *Attorney, Agent, or Firm* — Steinfl and Bruno Ltd (57) ABSTRACT

A user with a mobile device (e.g. cellphone) can transfer sensitive data to her device from another computer, where the latter might be a computer in a bank, or associated with a bank, like an Automated Teller Machine. The external computer has a screen that shows data, encoded in a barcode. The user's device has a camera that can take an image of the barcode and decode it. If there is too much data to be encoded in a single barcode, they could be encoded in several barcodes, which are then played on a computer screen and imaged by the user's device. The user avoids directly accessing the transmitting device on the Internet, for improved anonymity and privacy. The data that is transferred might be keys to a symmetric cryptosystem, or a one time pad, to encrypt a future interaction between the user and the other entity.

20 Claims, 4 Drawing Sheets

(56) References Cited

U.S. PATENT DOCUMENTS

| | | |
|---|---|---|
| 2010/0278453 A1 | 11/2010 | King |
| 2011/0000958 A1 | 1/2011 | Herzig |
| 2011/0178863 A1 | 7/2011 | Daigle |
| 2012/0044154 A1* | 2/2012 | Black et al. .................. 345/173 |
| 2012/0174224 A1* | 7/2012 | Thomas et al. ................. 726/24 |

OTHER PUBLICATIONS

Welcome to the OldSkool PC Carnival Sideshow!; 1999; The Oldskool PC; pp. 1-15.*
"Offline;" Microsoft Computer Dictionary; May 1, 2002; Microsoft Press; p. 473.*
U.S. Appl. No. 13/136,232, filed Jul. 28, 2011, Boudville.
U.S. Appl. No. 13/068,782, filed May 16, 2011, Boudville.

* cited by examiner

Step 1: Combining data input by a user with internal data and external data from a network via a first computer.

Step 2: Determining a desired sizing of the data to be displayed via one or more barcode outputs.

Step 3: Encoding the data into one or more barcode outputs.

Step 4: Providing the one or more barcode outputs on an electronic screen of the first computer onto one or more pop-up windows and/or webpages.

Step 5: Taking one or more images of the barcode output(s) via a cellphone camera.

Step 6: Decoding the one or more images of the barcode output(s) via a cellphone decoding software.

Step 7: Downloading desired data on the cellphone using data decoded from the barcode output(s).

Figure 4

TRANSMITTING AND RECEIVING DATA VIA BARCODES THROUGH A CELLPHONE FOR PRIVACY AND ANONYMITY

REFERENCES CITED

"Virtual Machines" by I. Craig, Springer (2005), 1852-339691.
"Bluetooth Essentials for Programmers" by A. Huang and L. Rudolph, Cambridge (2007), 0521-703751.
"Barcodes for Mobile Devices" by H. Kato et al, Cambridge (2010), 978-0521-888394.
"Optical Character Recognition" by S. Mori et al, Wiley (1999), 0471308196.
"The Bar Code Book" by R. Palmer, 5th edition, Trafford (2007), 1425-133746.
"Global Positioning" by N. Samama, Wiley (2008), 978-0471-793762.
"Applied Cryptography" by B. Schneier, Wiley (1996), 0471-117099.
"Cryptography and Network Security" by W. Stallings, Prentice-Hall (2010), 978-0136097044.
"Processing techniques for text capture from a rendered document" by M. King et al, U.S. Pat. No. 7,818,215 (Oct. 19, 2010).
"Method for data interchange" by D. Snyder et al, U.S. Pat. No. 7,798,417 (Sep. 21, 2010).
"Retrieving a web page a coded surface" by K. Silverbrook et al, U.S. Pat. No. 7,756,526 (Jul. 13, 2010).
"Using dynamic barcodes to send data to a cellphone" by W. Boudville, U.S. patent application Ser. No. 13/136,232 (Jul. 28, 2011).
"Cellphone changing an electronic display that contains a barcode" by W. Boudville, U.S. patent application Ser. No. 13/068,782 (May 16, 2011).
"Location based consumer interface for retail environment" by M. Daigle, US Patent Application 20110178863 (Jul. 21, 2011).
"Capture and display of annotations in paper and electronic documents" by M. King, US Patent Application 20100278453 (Nov. 4, 2010).
[The Web references are as of September 2011.]
anonymizer.com
invx.com
phpqrcode.sourceforge.net
grencoder.com
qrstuff.com
snapmaze.com
wikipedia.org/wiki/Barcode
wikipedia.org/wiki/Qr_code
wikipedia.org/wiki/Xwd
worldcat.org

TECHNICAL FIELD

The invention relates to the use of a cellphone to read barcodes from an electronic display.

BACKGROUND

One and two dimensional barcodes are now in common use. The two dimensional barcode in particular has seen popular deployment in signs posted at various locations. A common encoding is the use of the QR code.

Typically, the 2d barcode encodes a URL. A common usage is for a user with a cellphone that has a camera to take a picture of the 2d barcode. Software on the cellphone decodes this to the URL. If the cellphone has (wireless) Internet access, it then goes out on the Internet to that address and downloads the webpage and displays it on the cellphone, in a browser. Whereby the user can interact with it as a standard webpage.

A barcode is preferred over the display of the URL in human readable text, because the latter needs the mobile user to read it and type it into her cellphone browser. The small size of the cellphone screen and the awkwardness of typing letters on the cellphone make the input of the URL error prone.

Such displays of 2d barcodes are usually in permanent form. For example, printed on a poster or piece of paper. It appears that libraries which use such barcodes do so in printed form. Also, the barcode would typically decode to a URL that is the library's URL. Here, the library, if it is part of a university or school, might have a subdomain below that of its parent organisation.

SUMMARY

A user with a mobile device (e.g. cellphone) can transfer sensitive data to her device from another computer, where the latter might be a computer in a bank, or associated with a bank, like an Automated Teller Machine. The external computer has a screen that shows data, encoded in a barcode. The user's device has a camera that can take an image of the barcode and decode it.

If there is too much data to be encoded in a single barcode, they could be encoded in several barcodes, which are then played on a computer screen and imaged by the user's device.

The user avoids directly accessing the transmitting device on the Internet, for improved anonymity and privacy.

The data to be encoded might be a webpage or set of webpages, and the encoding could be done by a browser plug-in or an Encoder website. The data could be modified to only include a subset of the contents of the webpage.

The data that is transferred might be keys to a symmetric cryptosystem, or a one time pad, to encrypt a future interaction between the user and the other entity.

DETAILED DESCRIPTION OF THE PREFERRED EMBODIMENT

What we claim as new and desire to secure by letters patent is set forth in the following claims. ☐

For a two dimensional barcode, we choose as an illustrative example the QR code. But other barcode formats are possible. In what follows, when we refer to a barcode, it can assumed to be a two dimensional barcode unless otherwise stated.

Below, we will refer to a cellphone as the typical mobile gadget. In general, the device might also be a laptop, network, notebook, smartphone, electronic book reader or any other portable electronic device with a camera.

Figure 1:
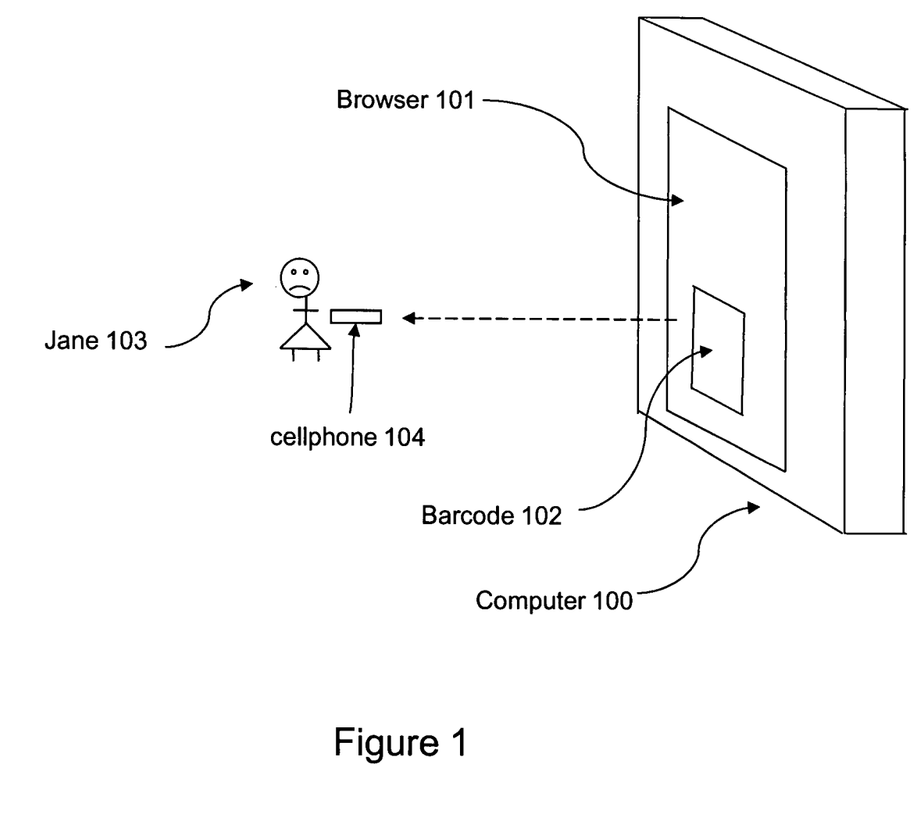
FIG. 1 shows a webpage with a barcode and a nearby user with a mobile device that has a camera.

The invention has the following parts—
1. Why Use
2. How to Use
2.1 No Browser
2.2 Browser
   2.2.1 Standalone Application
   2.2.2 Browser Plug-in
   2.2.3 Encoder Website
   2.2.4 Plug-in and Encoder Website
2.3 Several Barcodes
2.4 ATM Card Replacement
2.5 ATM Modification
3. Cryptographic Keys and One Time Pad
4. Library Lookup
5. Extensions 1. Why Use FIG. 1 shows a webpage in Browser 101, where the browser is in the screen of Computer 100. The computer is assumed to be a desktop or laptop computer connected to the Internet. In the browser is Barcode 102. Near the browser is a user, Jane 103, with Cellphone 104. The latter has a camera that can take a photo of the webpage or a subset of it. The webpage is from some website. Typically when a barcode appears in the page, it encodes a URL, perhaps of that website or of some other website. The usual intent is that a visitor (Jane) is assumed to have a cellphone with a camera. The website wants Jane to take a photo of the barcode, and then decode the URL and go to it in the phone's browser; assuming that the phone has the requisite software and Internet access.

Yet this usage is somewhat suboptimal. If Jane has Internet access on the phone, then she can use her phone's browser to go directly to a copy of that webpage being shown on Computer 100. The webpage (which now also appears on her phone browser) could display, instead of or in addition to Barcode 102, a standard hyperlink of the URL that was encoded in the barcode. So when Jane clicks on this link in her phone browser, she completely avoids using her camera. There is no point to showing the barcode. The only real issue is how hard is it for Jane to type into her phone browser the URL of the webpage in Browser 101, and not the complexity of the URL embedded in the barcode in that webpage. Note the distinction between these 2 URLs.

A surprising number of websites do show such barcodes. Either their authors do not understand this, or perhaps they want to appear trendy to visitors, who are new to using barcodes on their phones.

In passing, it should be noted that there is one class of websites where in the state of the art, it makes sense to show barcodes. These websites let a visitor (Jane) type a URL or some other text. A barcode is made to encode the data, and the barcode is shown on a webpage. Jane can save the image on Computer 100, and then feed the image into some output printer, to make a poster or flyer or tee shirt, for example, with the barcode printed on it. Jane does not need to use a cellphone and the context is that typically Computer 100 and the printer are in her workplace.

Aside from these websites, the general usage helps to provide a context of the existing state of the art, and for why this invention differs.

Figure 2:
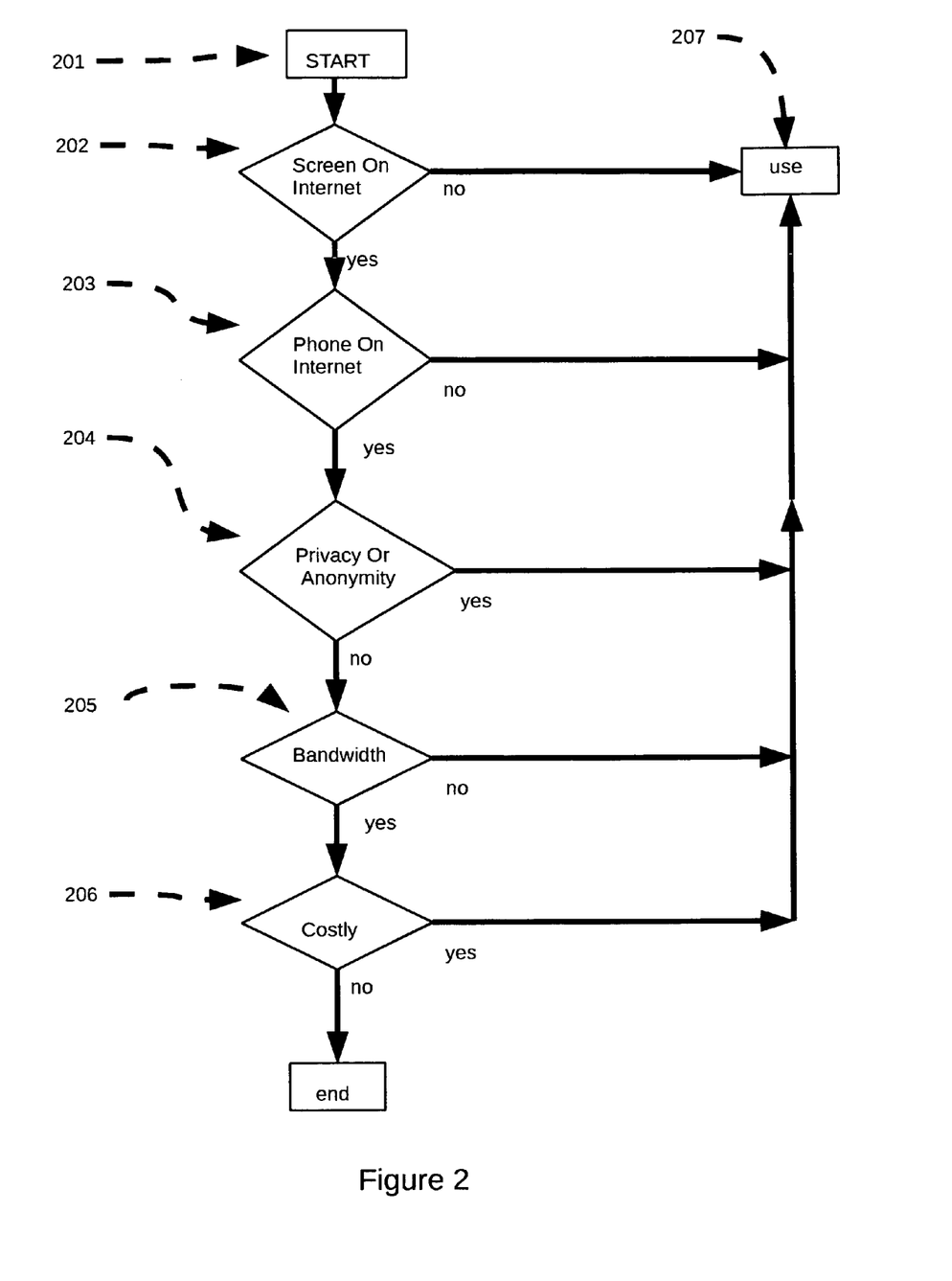
FIG. 2 is a data flow diagram depicting typical reasons to use this invention.

Consider FIG. 2. It is a flow chart of the main reasons for using this invention. It refers implicitly to the configuration of FIG. 1. Starting at the top, Item 201 is the entrance to the decision logic. It assumes that Jane wants to record the data on Computer 100's screen onto her phone. We defer the reasons why she wants to do this till later.

The first decision is Item 202: is the image on Computer 100's screen available on the Internet? If the answer is no, then Jane needs to take an image of it with her phone and the logic goes to Item 207, the steps of which are described in the next section.

If the answer to Item 202 is yes, then we go to the next question in Item 203: Does her phone have Internet access? If the answer is no, then Jane needs to take an image of it with her phone and the logic goes to Item 207.

If the answer is yes, then we go to the next question in Item 204, where implicitly it is assumed that the phone has a browser. Since the phone has Internet access, most people use that access via a browser. At this point, it might be asked, if Computer 100 is on the Internet and showing a webpage in Browser 101 then surely Jane can surf directly to it with her phone, as discussed earlier.

But Jane might be reluctant, for reasons of privacy or anonymity. Suppose Computer 100 is inside a bank, and it only displays the bank's website. Jane uses it to login to her account and do some actions. The website then makes some data which she wants to put into her phone's electronic wallet. In principle, she could have done all this on her phone's browser, and then used some mechanism to transfer the data from the bank's website onto her wallet. But she or the bank is concerned about eavesdropping. Even if she is physically in the bank, if she uses her phone's browser to visit the bank's website, the network packages traverse the Internet, through multiple parties.

By using her phone's camera to get the data from Computer 100 via a direct optical interaction, it bypasses the Internet. This is a short range, line of sight interaction that is very difficult to eavesdrop on.

Here, an important reason for using this invention is privacy. Keeping the transferred data secret.

Another reason is anonymity. Suppose instead that Computer 100 is in a library or cybercafe, where Jane can walk up to it and browse the web without having to register her identity with the computer's owner. For a cybercafe, she might have paid cash to use the computer. She uses the computer to go to a website, rather than her phone's browser because there are at least 2 cases of concern to Jane.

First, she might not want the website to know who she is, or be potentially able to find out who she is. If she uses her phone's browser, that browser has an Internet address assigned to it by her phone company.

We include in this the case where the phone company uses Network Address Translation to assign a unique combination of an IP address and a port number to Jane's browser. For brevity, we shall just say 'IP address' to include this case.

The phone company thus has a record linking her phone's IP address with the IP address of the website she visited. Even if the phone's IP address is dynamically assigned, the phone company still can associate her phone with the visited website. The latter knows the phone's IP address every time she visits.

Hence the website could in principle, via the courts, force the phone company to reveal her phone number and other information about her.

The second case is that she does not want her phone company to know about her browsing to that specific website. Here she might not care that the visited website knows something about her.

Both cases also include the possibility that there might be a man in the middle (MITM) attack if Jane makes an Internet access to the website by using her phone. This invention can defend against the attack, through a physically direct out of band communication via the optical channel and the phone's camera.

One possible alternative to this invention is for Jane to use her phone's browser to first access an anonymiser website, and thence using that to access the website in FIG. 1. But there are several problems.

First, most anonymisers charge a fee. If Jane pays with a credit or debit card, that can let the anonymiser know who she is.

Second, and related to the first reason, she might not be confident that the anonymiser organisation will not reveal or be forced to reveal her interactions with it and the websites that she visits using it.

Third, the use of an anonymiser as an intermediate website can be slow, in no small part because of the encryption typically used by most such websites. The slowness can be exacerbated if she deliberately chose an anonymiser located outside her country, so that it is not subject to jurisdiction by her courts. But this adds to the network delays when she uses it.

Fourth, there is a possibility that her phone company, or a rogue employee within it, could see the unencrypted form of the webpage that gets displayed in her phone browser. The phone company assigns her phone an Internet address, which is then used by https or Transport Layer Security [TLS] when Jane uses her browser to make an https connection. It may be that this is unwrapped by a receiving machine at the phone company. Where the resultant webpage might then be encrypted or encoded for the wireless transmission to the phone. If so, then the phone company has access to the decrypted contents.

Note that this invention assumes that there is no other way for Jane's phone to directly access the data on Computer 100. For example, via memory stick. This would require slots for the stick on Computer 100 and on the phone. In general, at least for the choice of a phone as the mobile device, there is unlikely to be such a slot.

Other possibilities include Bluetooth or infrared. These all require extra hardware on Computer 100 and on the phone. This invention assumes these do not exist, as the minimal assumption for the hardware on both devices.

Hence if Jane wants privacy or anonymity, then the answer to Item 204 is yes and she goes to Item 207 (the next section).

In a related manner, the organisation owning Computer 100 might want to transfer data to Jane's phone via the barcode for similar reasons, if it is unsure about the security of the normal wired and wireless network path to Jane's phone.

If the answer to Item 204 is no, then we go to Item 205. This refers to the case where there might be insufficient bandwidth for the normal wireless communication mode, where this covers both using the phone company's equipment (basestation etc) and where the phone uses, say, WiFi and some third party's WiFi hot spot to link to the Internet.

If there is not enough bandwidth, then the answer to Item 205 is no, and we go to Item 207.

If the answer is yes, then we go to Item 206. This asks if the bandwidth has some monetary cost that is excessive, as deemed by Jane. If the answer is yes, then we go to Item 207.

So while the emphasis in this invention is on the reasons of anonymity and privacy, there could be secondary reasons of congestion and cost that motivate its usage.

2. How to Use

Refer to FIG. 1. It assumes that Computer 100 has a screen capable of showing a barcode. So the screen has bitmapping and a resolution sufficient to show barcodes, for a given choice of barcode type (like QR). The barcode type could have several levels of resolution. But it is assumed that the screen can at least show the lowest resolution. This means that for a barcode type that uses 2 colours, the screen must be able to show at least 2 different colours, where the colours differ by enough so that a typical camera and downstream decoding can distinguish between those colours.

Figure 4:
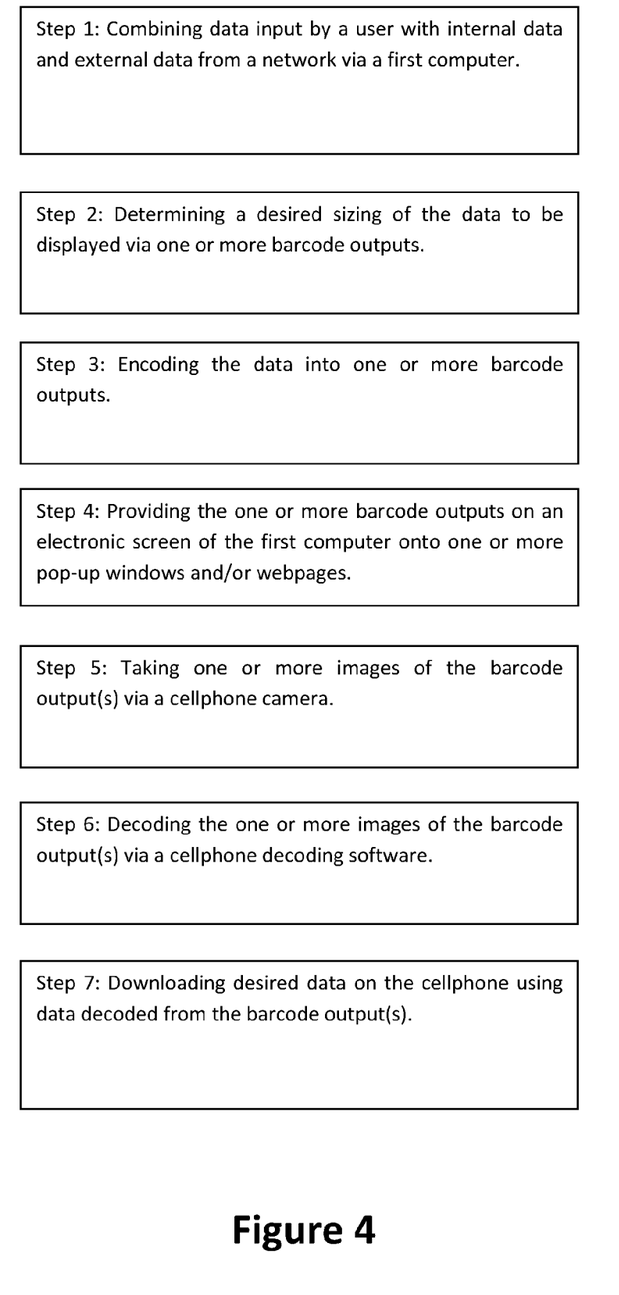
FIG. 4 shows a flow chart diagram depicting steps associated with embodiments according to the present disclosure.

We consider 2 cases. The first is when Computer 100 does not use a browser. The other is when it uses a browser to show the barcode (and other data). A general overview of steps involved in the above two cases (as well as other embodiments discussed later below) can be seen, for example, in FIG. 4 which illustrate steps as a flowchart.

2.1 No Browser

In FIG. 1, there now need not be Browser 101. This could be replaced by, say, a graphical Window 101. Because if Computer 100 is not on the Internet, then it might not need or be able to display a browser. In FIG. 1, in this case, Window 101 might be considered to be in an enclosing area, which could contain buttons and other input devices, like a keypad or keyboard or trackball or mouse. Or Window 101 might have regions of it or all of it touchable, where this can be used by the user to make choices. Examples of Computer 100 might be a modified Automated Teller Machine or a computer kiosk in a shopping mall.

This invention assumes that Jane can now access (e.g. touch or press) any buttons or keys or other input devices on Computer 100. She might use these to type in some data (like her username and password if appropriate) or to pick some options.

This assumption differs from the earlier assumption about minimal hardware on Computer 100 and on the phone. That referred to minimal corresponding hardware. For example, a Bluetooth transmitter on Computer 100 would need a Bluetooth receiver on the phone. Here there is no assumption about any hardware on the phone that corresponds to an input device on Computer 100.

Computer 100 then uses Jane's choices to produce some output data, which it then encodes and displays as Barcode 102. In general this data is not simply just what Jane typed or pressed. It can depend on other data stored inside Computer 100, or accessible by it from other machines on a network. This is another way that this section of the invention differs from the earlier mentioned case of websites that let Jane type in some text and then make a barcode based solely on that text.

Note that the data that gets encoded does not necessarily have to be displayed in its pre-encoded form by Computer 100. Instead, the computer might display some or none of it.

Jane then uses her phone to scan Barcode 102 and decode it. There could be downstream applications loaded on her phone that takes the decoded output as input. Perhaps into an electronic wallet.

If Computer 100 were to display all the data that it encodes, then Jane might be able to avoid using barcodes entirely, by taking an image of the displayed data. But even here, it could be advantageous to Jane to image the barcode. Suppose the decoded data on her phone were to be used by some phone application. The latter might need data in digital form, and not as an image. She might not have any Optical Character Recognition (OCR) software on her phone, that can extract text data from the image. Whereas the data encoded by Computer 100 is already digitised.

Barcode 102 might also be an electronic receipt. For example, if Jane is at an ATM and withdraws money, the machine might print a receipt by default. But there could be an option to let it make a barcode which Jane then scans into her phone.

If the data to be encoded is too big for one barcode, several could be made. See section 2.3.

2.2 Browser

Now in FIG. 1, Computer 100 uses Browser 101 to show a webpage at some website. The website could have options to let Jane enter some data, and then it makes an output data set which it encodes into Barcode 102. Jane can then use her phone to decode it, possibly into some downstream phone application as in the previous Section 2.2.

This is the case where the browser is showing a website that explicitly makes a barcode. In general, most websites do not do this. There are now two variants of this invention, that extend the invention to cover the case of an arbitrary website. This involves either the installation on Computer 100 of a standalone application or a browser plug-in. These have the common effect of being able, albeit to varying degree, to make barcodes of arbitrary webpages or subsets thereof. Both might be present on the same computer. But a preferred implementation is for the browser plug-in to be installed.

2.2.1 Standalone Application

This is a program that is installed on Computer 100. It can be invoked by Jane, to take a snapshot of the webpage currently shown on the browser, or perhaps of a subset of that webpage. For the latter, the application might let Jane use the mouse (or equivalent device) of Computer 100 to designate a rectangular region of the browser, and the application then makes a snapshot of it.

In either case, the application converts the snapshot into a barcode, which it displays in a window, of which Jane can then take a photo with her phone.

There already exist several applications on the main desktop operating systems that can do an image capture of the screen or a window within the screen. For example, under a linux or unix operating system, there is typically the program xwd ("X window dump"). And, as already mentioned, there are applications that can make a barcode from input data. Hence a new application that combines these existing programs is straightforward to implement.

The standalone application has some drawbacks. In general, it can only access (=capture image) what is visible in the browser window. Where we assume in the context of this invention that Jane is not interested in anything else on the computer. The application cannot typically go into the memory of the browser. This is a standard security precaution where runtime applications are isolated from each other. For this not to be true for a standalone application, it needs to be run with special privileges (e.g. perhaps as the root user in a linux or Unix machine). In general this will not be desirable on many/most machines.

One limitation of the standalone application is if the browser is showing only a portion of a webpage, because the latter is larger than the browser's sizes, then sliders (vertical or horizontal) might appear on the browser, to indicate what portion of the total page is currently visible. But the standalone application can only take an image of the visible portion. Which can be of limited use to Jane, if she wants data from more of the page than just the visible portion.

And of the (visible) image that the standalone application accesses, it only 'sees' this as a flat set of pixels. There is no inherent structure within this, unless the application were to use methods like OCR to extract any text from the image and then only encode that text.

If the data to be encoded cannot be stored in one barcode, then several might be made. Refer to section 2.3.

The standalone application has limited applicability, compared to the browser plug-in and website (to be discussed next). The main reason is that Jane can avoid taking an image of the barcode. She might just take an image of the data shown in the browser. This follows the discussion in Section 2.1.

2.2.2 Browser Plug-in

The browser has a plug-in that implements aspects of this invention. The plug-in can access the full HTML source of the webpage being shown. This assumes that the webpage is written in HTML, which is the most common case.

In this section, we will describe options available to the plug-in for encoding, and options for Jane's phone browser after decoding. From the context, it should be clear which options are discussed.

The plug-in can have options that let Jane choose what is to be encoded in the barcode. The options discussed below can generally be chosen independent of each other.

One option is to encode the entire HTML source. This means that when Jane decodes this barcode on her phone, it decodes to a local file, and by displaying it in her phone browser, she can see the webpage that was shown on Computer 100, with some caveats. This might be with the phone browser deliberately not being connected to the Internet. So any images or other external assets referenced by tags in the HTML page will not appear or be played.

For images to be shown without making an Internet connection, another option is to also encode any images referenced in <img> tags in Computer 100, where the image file is at some URL. The plug-in can take each <img> tag, download the file into a temporary memory area, and replace the tag with <img src="bat.jpg"/> in the HTML file, before the file is encoded.

A suboption is for the original image tag to be retained in the HTML file, but embedded inside a comment. This means that in the phone when the decoded files are viewed, Jane has the ability to look into the source and see the original URL of the image.

The various options explicate the idea that the page to be encoded can be deliberately modified prior to encoding.

One option is to write the webpage's URL into the file that is encoded, as a comment. Jane can later read this comment and decide if she wants to visit that URL directly from her phone browser. She might also apply some blacklist or whitelist or other analysis to the URL. Sometimes, the part of a URL after the domain name has some structure with semantics, against which heuristics could be used.

Above, when we mentioned the encoding of an image, this would be into a local file, which is then made into its own barcode. So for a webpage with 2 such images, we could end up with 3 barcodes, one for the HTML source, and one for each downloaded image. The expectation is that on the phone, the decoding process will write to 3 files in the phone's local file system. (Presumably, the files will be in the same directory.)

In section 2.3, we discuss further how to handle several barcodes.

An option is for a maximum value to be used for the size of an image or source file that is encoded. This reflects the case that for a given choice of encoding, there is a maximum size of input data that can go into a barcode. If a file exceeds this, then it might be split into several subfiles, where each can be made into its own barcode.

An important case is where the file is an image file. There could be an option for the plug-in to first convert the image into a lower resolution image. Perhaps by decreasing the number of colour bits per pixel, or by converting a colour image to grayscale, if possible. Or by lowering the spatial resolution, if possible.

It might be asked—why store/encode local copies of any images in a webpage, if Jane's phone can access the Internet? The above option exists because Jane might not want her phone to go across the Internet to the addresses of those images to download them, for reasons of privacy or anonymity discussed earlier.

This allows other encoding options. One is if the images are at URLs with the same base domain as that of the webpage being encoded, then they are (downloaded AND image tags rewritten to use local images), while images from other base domains are kept as references in the source code.

In the above example, an image was held at a website called "dog.ball.com". The base domain is "ball.com". Suppose the webpage is at the domain "cat.ball.com". Its base domain is also "ball.com". So the option might be to download the image and rewrite the image tag.

The motivation is that suppose Jane does not want to directly access the webpage on her phone. For the same reasons, she does not want to download images from what is essentially the same domain (what we call the "base domain"), because this is equivalent to letting that domain know of her phone's access of it.

Above, we discussed images. Other types of tags could be present in the original webpage, that use URLs to locate other types of assets on the Internet. One option is to include the tags in the encoded barcode, but commented out. So that Jane can manually inspect these on her phone, and decide if she wants to uncomment and activate them.

An important special case, aside from images, is of audio files. These might also be encoded as barcodes. Though given the sizes of typical audio files, a decision could be made by the plug-in to only encode the first x bytes of an audio file, where x might be a parameter adjustable by the user. Even in this case, it could be possible for an audio file to produce several barcodes.

For processing audio files, the plug-in could run an Automatic Speech Recogniser against the audio. This tries to convert audio to text output, which is usually of much smaller size. The text is then used as input to the encoding, in place of the audio. In this case, a comment tag could also be made, that encloses the original audio tag, or perhaps just encloses the URL within that tag. So that Jane has the option on her phone to see where the original audio came from.

Another option is for Jane's phone browser. There could be a format to the commented out tags made by the plug-in, so that the phone browser can detect this specific format. For example, a comment tag in HTML starts with "<!". So a short string could be appended after this, that is not generated by other markup programs. This string is documented, so that the phone browser can be coded to automatically detect these comments and unwrap the commented out source and present these in some visible format (e.g. a popup window) or otherwise let Jane decide for all of them whether to uncomment.

For example, on the phone, Jane might have a blacklist of some domains. So if a decoded webpage has commented out tags with URLs with base domains in that blacklist, then they stay commented out. Conversely, there could be instead of or in addition to the blacklist, a whitelist of domains. So if a decoded webpage has commented out tags with domains in the whitelist, then they are uncommented. And the phone browser could automatically load data from those domains. Or the phone browser might ask Jane first, if she wants it to do this.

Another encoding option is to only encode the "visible" text in the webpage. Where here we mean not just what is physically visible in the browser, but also what is currently hidden because the browser's dimensions are not large enough to show more of the page.

This is equivalent to the case of the standalone application in the previous section, where it uses OCR to isolate and only encode any visible text. The advantage of a plug-in doing this is that it can access the entire visible text in an HTML file, without being constrained by a browser window size.

Another encoding option involves the active effort of the website that wrote the webpage being shown in Browser 101. There could be custom tags defined, like <barcode> and </barcode>. These would be written into the webpage. Not being standard HTML tags, a browser will not display them, so they do not affect the visuals of a webpage. But the tags would delimit text or also possibly any HTML tags. So if the plug-in see these tags, it will only encode the delimited contents. There could be several such delimited areas on the webpage.

There could be a suboption that tells the plug-in whether to encode all the delimited contents, or only encode delimited visible text (that is, omit all tags), or omit just HTML tags and retain all delimited non-HTML tags.

The plug-in might also show in the popup window that displays the barcode, the text or area of the webpage that was encoded.

2.2.3 Encoder Website

The functionality ascribed here to a plug-in could also be equivalently achieved by an 'Encoder' website. This is analogous to a typical anonymiser website that has a text entry box in its webpage, in which the user types a URL. The anonymiser then goes to that website, downloads the page to its website and rewrites the links so that they point to the anonymiser's website, and then displays the page as a page local to the anonymiser website. The encoder website could perform similarly, where now the various encoding options described in the previous section for a plug-in could be made available via a standard webpage at the encoder's address, and where the output could be a barcode [or several] in a popup window or in another browser window or tab.

The encoder website might choose to only use http (instead of https) when displaying a webpage from some arbitrary website. This differs from an anonymiser which could typically use https. It lets the encoder be faster than an anonymiser.

An encoder website offers different functionality from a plug-in. Suppose the website lets or requires users to login, and keeps a history of user actions for each user. Then when Jane logs in, the website could pick the settings of options (that were described in the previous section for a plug-in) based on the choices she made in her previous login. (Assuming that the latter exists.) For a new user, the default options might be based on the most common choices made by other users.

2.2.4 Plug-in and Encoder Website

The encoder website and the browser plug-in can offer similar options.

One option runs a blacklist against links in a displayed webpage. If a link has a domain in the blacklist, it might not be copied into the barcode, or it might be sterilised inside a comment before encoding.

Another option is the ability to optimise the webpage for display on a cellphone. This might be for a generic cellphone; e.g. making assumptions about the screen sizes and colour depths of most cellphone screens. Or it could be for the cellphone that Jane uses. In this case, Jane might have earlier indicated to the encoder or plug-in which type of cellphone she has, and they could have a database of cellphones from which they look up relevant parameters.

The optimising could include restrictions on the maximum or minimum font sizes. So for example HTML size tags like <h6>, where here '6' is the size, might be automatically edited to change the sizes.

Another restriction could be on the types of fonts used. For example, it might be desirable to use fonts that are simpler to display on a small screen. So a single stroke or sans serif font could be used to replace a more elaborate font.

There could be a style sheet optimised for generic cellphones, or style sheets optimised for different cellphones. These might be used in place of references in the webpage to an existing stylesheet.

Another option is to start at the webpage shown in Computer 100 and spider its links to download those referenced webpages, down to some level. The depth of spidering could be chosen by the user, with some default value.

An alternative to a uniform depth of spidering is to apply heuristics to terminate the following of a given link in a webpage. One heuristic could be when the domain in that link is on a blacklist. So the referenced page, and references inside it, might be deemed unreliable. The inverse heuristic is possible. Where a webpage is downloaded, and also pages linked from it, precisely when that page's address has a domain in a blacklist. Here, Jane might be investigating such websites. This is also a context where she might not want to go to such websites directly from her phone browser and is using Computer 100 as a proxy.

The result would be a set of (usually) HTML files. The options described in Section 2.2.2 for the plug-in dealing with a single webpage could be applied to each of the spidered pages. The set of files could be wrapped into a tar file, which is then encoded.

There could be a parameter for the maximum size of a webpage to encode. If a webpage is larger than this, then one option is to simply cut off the source code of the page when the limit is reached. The problem is that if the resultant page is decoded by Jane's phone and displayed, it will likely no longer be a valid webpage.

An alternative is the 'intelligent' truncation of a webpage that is too large. Computer 100 might first remove all the source that is larger than the maximum size. Then it inspects the resultant source and if necessary, and if the webpage is in HTML, it appends any HTML closing tags, like </body> or </html>, to make the final document well formed.

Likewise, it is possible that the truncated page might have HTML structures that are cut off, like a table. To the extent that it is possible to do programmatically, Computer 100 can repair these. Either by appending any necessary closing tags, or by deciding to include enough of the original webpage that is beyond the maximum size, until there is closure of the HTML structure that is at that size boundary. The latter means that the maximum size is not a hard limit.

If the document is XML, then Computer 100 could append any closing XML tags to make it well formed. Or to follow steps similar to the above for dealing with HTML documents.

An option is the use of a virtual machine (VM). This could be to protect Jane's phone browser from malware inside a webpage. This includes malware that might target a given combination of browser, operating system (OS) the browser runs in, and hardware that the operating system runs on.

Consider the encoder website. It could have virtual machines for various values of (browser, OS, hardware). The choices might be the most popular combinations in the marketplace. When Jane goes to the website, she might tell it her choices. To some extent this can be done automatically in an HTTP query, which might tell the encoder website the browser on the phone.

When Jane tells the encoder to go to some webpage, it downloads that page to itself and then invokes the appropriate VM, if it exists, and tries to display the webpage in the emulated browser on that VM. The encoder runs programs that look for malware behaviour by that webpage. These programs might run at any of 4 levels. The lowest level is as a modification of the emulated browser. A higher level could be a program run by the emulated operating system that scrutinises the emulated browser, in case the latter is caused to crash, for example.

A higher level could be a program run by the emulated hardware, to look for an error condition like a crash of the virtual operating system.

The highest level would be a program run directly by the encoder's operating system. It scrutinises the entire emulation, looking for a crash or other failure or suspected malware condition, like an infinite loop.

2.3 Several Barcodes

Here we describe issues common to sections 2.1, 2.2.1, 2.2.2 and 2.2.3.

One common aspect is the possibility that several barcodes are made. How to show them? In U.S. Pat. No. 8,348,149, "Using dynamic barcodes to send data to a cellphone", we treated this problem. The reader should consult that for more details. In brief, one way is to play the barcodes in a barcode 'video' at one location in a popup window made by the application or plug-in. While for the Encoder website, it might not need to use a popup window, but instead just use a standard webpage to show the dynamic barcodes.

The phone decoder is modified from a standard barcode decoder to be able to scan and decode each barcode from the barcode video. It can merge data across temporally adjacent barcodes into the same output file, or to produce different output files, as appropriate.

Another possibility is due to the scenario of this invention, where Jane can directly access (touch) the screen of Computer 100 in FIG. 1. In the previously stated U.S. Pat. No. 8,348,149, Jane could not make direct physical contact with the computer. In the current invention, instead of the barcodes being played like a video, each different barcode might appear in the plug-in's popup window, one at a time, at a common location in the window. The window could have a button that Jane can click, after she has taken a photo of the current displayed barcode, so that the next barcode is then displayed.

The steps of the previous paragraph referred to when a plug-in of a browser is used. With trivial changes, it also applies to the case of Section 2.1, with no browser. Here, the location on the computer where the barcodes are to be shown could have a button (hardware or software) nearby, where Jane could press, to manually advance through the display of the set of barcodes.

If the barcodes are played as a video, for a given average barcode resolution, then given the size of the data to be encoded, Computer 100 can estimate the download time. It can print this on its screen, and during the download it can give a graphic of a percentage bar, indicating what percentage of the barcodes have been displayed.

Also, whether the barcodes are played as a video, or manually by Jane pressing a button, there could be another button or buttons that let her manually adjust the barcode resolution. This could be the average barcode resolution, if the downloading permits different barcodes to have different resolutions.

For the barcode video, there could be a button on Computer 100 that lets Jane stop or pause the downloading, and then to restart it, either from the beginning or from the last barcode shown when the pause was pressed or from some earlier barcode in the sequence.

When running the barcode video, the encoded data might also include a barcode number. This can be done even if the data is binary. One way is for XML style tags to be used. The encoded data might be in the format—

```
<frame>
<c>158</c>
<d> <!-- rest of data goes here --></d>
</frame>
```

The <c> and </c> tags define a frame or barcode number. While the <d> and </d> tags enclose the rest of the data. Note that even if the latter data contains <c> and <d> tags, that is not a problem in the decoding on the phone, because the phone looks for the last </d>, followed by a </frame>.

More sophisticated labels could be used. The above is meant as a pedagogic and simple implementation.

Note a given choice of barcode encoding (like QR code) would likely have error correction built in (and QR does). However this pertains to the decoding of a single barcode. When there is a barcode video, the possibility is that entire barcodes or subsequences of barcodes within that video might not be detected by Jane's phone. This assumes that the encoding of a frame number and the transmission is error free. But the phone camera might be accidentally and temporarily turned away from the transmitting screen, for example, causing it to completely miss any barcodes during that time.

The presence of a frame number lets the phone detect absences, either during or after the transmission. The phone might alert Jane in some manner, e.g. by beeping or vibrating or displaying an error message on its screen. This could be especially useful during transmission.

In either case, the phone might display the numbers of the missing frames. Or perhaps just the lowest number. Jane can then input these into an appropriate location on the screen of Computer 100. Which can then retransmit the missing barcodes.

A default could be that when several barcodes are missing, the retransmission starts from the lowest one. This is simpler for Jane to input into Computer 100. The phone then decodes the stream.

2.4 ATM Card Replacement

Figure 3:
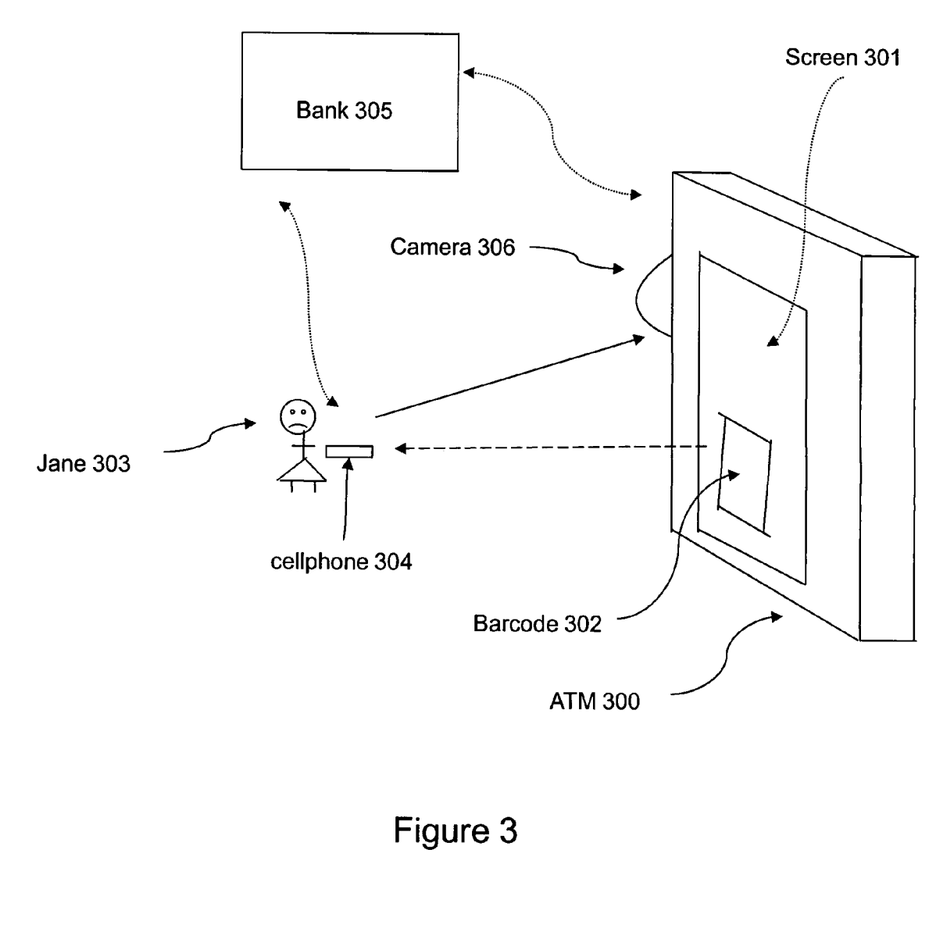
FIG. 3 shows a user and an ATM showing a barcode for identity verification purposes.

Consider FIG. 3. It is an extension of FIG. 1. The elements in FIG. 1 map to the obvious corresponding elements in FIG. 3; e.g. Jane 101 in FIG. 1 is Jane 303 in FIG. 3, etc. While Computer 100 in FIG. 1 is ATM 300 in FIG. 3. The new element is Website 305.

The context or application is where Jane is at a bank's Automated Teller Machine, ATM 300. This is in bidirectional contact with Bank 305, which is the bank's server. This connection could be a combination of wired and wireless. Also, there could be intermediate machines along this connection, that act to pass the messages. The machines might include routers, hubs and switches. In the context of this invention they are transparent (invisible) and are omitted for clarity.

It is assumed that Jane's cellphone 304 can communicate with Bank 305. This could be via the phone provider, which in turn is linked via an electronic network to Bank 305. The communication is wireless and wired. Various machines, like the base station of the cell that the phone is in, are omitted as they are transparent in the context of this invention. Or the phone might be using a WiFi hot spot.

Normally when Jane wants to use the ATM, she inserts her ATM card into it. The ATM reads her account number off the card, and then prompts her to type in her password. Now, in this invention, when Jane is at the ATM, she presses a button on or near Screen 301. This causes one of two things. First, ATM 300 communicates with Bank 305, and the latter generates a token and sends this to ATM 300. Or, secondly, ATM 300 makes the token and sends a copy to Bank 305.

In both cases, the token might have a combination of two types of data. The first is a string that indicates which ATM Jane is at. The second is a random bit sequence.

ATM 300 makes and displays the token as Barcode 302. Jane sees this and takes a photo with cellphone 304, which decodes it and sends it to an application on the phone. The application has a previously stored value of the network address of Bank 305. This address might be a phone number or an Internet style URL. The application might have several stored values, for different banks that Jane has an account at.

The application formats the data, perhaps as XML, and sends it to the address it has for the bank. The message might be sent as an SMS text message, or as email, for example.

When Bank 305 gets the message, it looks at the sender value. If the message is SMS, this value is a phone number, which is very hard to forge, under the current phone message protocols and phone hardware, and SMS might be the preferable mode of communication under this invention. If the message is an email, the sender field is very easy to forge.

In either case, Bank 305 looks up its records. Earlier, before Jane was at the ATM, she told it the number of her cellphone and possibly her email address. So Bank 305 stores this and links it to her account. When Bank 305 gets the message, from the sender field, it finds Jane's account. This bypasses the need for her to use her ATM card to tell the bank her account number. From the message body, it finds the data that maps to the specific ATM 300. It also finds the random data that it or ATM 300 had earlier made. By comparing the random data in the received message with the stored copy, it can verify that there is a closed communication loop in FIG. 3.

Bank 305 instructs ATM 300 to prompt Jane to type her password. Note that even if the phone were to send its message as email, and so the sender field is malleable, the forging of this by an attacker still does not give access to her account.

Note also that in the communication from the phone to the bank, her account number is not transmitted.

One simpler variant of the above is where the data in Barcode 302 only has the id of ATM 300. If the data is successfully transmitted by the phone to Bank 305, then the bank just uses the sender field to map to Jane's account.

For Jane, not having to use or carry her ATM card could be a useful feature of the invention.

The above relates to a bank verifying its customer. The reverse is also possible. One context is where Jane might be travelling, and she sees an ATM that purports to be from Bank 305. There have been cases where fraudsters have installed such standalone machines, which are not inside a bank branch. When a customer inserts her ATM card, she is prompted for her password, which she inputs. The machine scans her card and gets her account number. It then ejects the card, giving some type of fake error message about the network being down (unavailable). The fraudster uses the data to forge an ATM card with her account number. The card is used at a real ATM machine to withdraw money.

In this invention, Jane has her phone make a random string. It is sent in an SMS or email to Bank 305's address. The message includes the phone's location, assuming that the phone has GIS ability, or some other means of geolocation. Bank 305 gets the message. It first checks that the sender field maps to a known customer. This is optional, but avoids having the bank perform future steps for non-customers.

The bank extracts the geolocation data and maps this to the real ATM 300. It sends the random data it got from Jane to ATM 300, which encodes it as Barcode 302. ATM 300 can show a plaintext message on its screen, telling Jane to take a phone of Barcode 302 to verify. When she takes the photo, it is decoded and the data goes into an application, typically the earlier one which might still be running, that verifies the data against the earlier generated data.

Why doesn't Jane just type some sequence of letters and digits into her phone, and have this transmitted (along with the phone's location) to Bank 305, which then has ATM 300 display it on its screen, instead of using barcodes? One answer is that Jane might type a weak sequence; e.g. too short, or it is a word. Another is that she might repeat a sequence (weak or not) the next time she is at another ATM of this bank. Another is that the sequence she uses, or repeats, might be her password. It is well known that people often use the same password for several of their accounts. One danger in these cases is where when the messages go over the network, they are copied. By packet sniffing by eavesdroppers or by malware installed on relay machines.

2.5 ATM Modification

Most ATMs have a camera nearby, that images the users. The images are typically stored, with no analysis done in real time. In this invention, one possibility is for image analysis software to be run in real time by the ATM.

This could be invoked when Jane goes up to the ATM and presses a button on it that says e.g. 'barcode'. She holds up the screen of her cellphone to Camera 306 in FIG. 3. This is the ATM's security camera. The phone screen has a barcode. The ATM button triggers software on the ATM that looks for a barcode in Camera 306's image or video feed and decodes it.

The barcode encodes her username or account number and possibly other data. The pre-encoded data might be in some published format, perhaps using XML tags. On the other side, the ATM's software understands these tags and can parse the decoded barcode to extract the data fields.

If the ATM is unable to decode the barcode, it might play audio telling Jane of this, and likewise display text on its screen to this effect. The audio or text could suggest possible remedies, like Jane holding the phone screen closer to the ATM camera, or making sure that it is the phone screen side of the phone that is pointed towards the ATM camera, or to hold the phone steadier.

Assuming that the ATM successfully decoded the barcode, it could then prompt her to type her password into its keypad and then pass the total data to Bank 305 for verification.

A variant is where when ATM 300 decodes the account number, it passes this to Bank 305, to verify that it is valid. If so, then ATM 300 prompts Jane to type her password.

It would be a bad idea for the barcode to also encode her password. This would mean that if she loses her phone, someone could simply use it at an ATM to withdraw money.

The method of this section is potentially more convenient for Jane. The data that her phone encodes into a barcode could be pre-defined by her at some earlier time. It can go beyond the simple account number that a conventional ATM card provides. For example, suppose she has several accounts at the bank, like a checking, savings and brokerage account. And she regularly withdraws the same amount of cash from her savings account. The data going into the barcode might have statements like

```
<type>savings</type>
<account_number>...</account_number>
<amount>60.0</amount>
```

Likewise, if she has another common mode of usage, she could store a different set of data. So when she uses her phone at the ATM, she can invoke the appropriate data. This can be quicker for her than going through the operations manually at an ATM.

She might also send several barcodes of data. And the ATM can decode these using the methods of our earlier U.S. Patent, "Using dynamic barcodes . . . ".

3. Cryptographic Keys and One Time Pad

One use of this invention is to transmit keys for a symmetric cryptosystem from one party to another. The first party could be Computer 100 in FIG. 1. The second party could be Jane in FIG. 1. If they want to have an encrypted conversation between each other in the future, using a symmetric cryptosystem, then they first need to define a shared secret of a key to that cryptosystem. Here, it is assumed that both parties already have the necessary hardware and software that implement the same cryptosystem.

To share the key, Computer 100 makes it, and then makes a barcode that encodes the key, and displays it as per FIG. 1. Jane then uses her cellphone, by bringing it close to Computer 100, and taking a photo of the barcode, which the phone then decodes into the key.

The maximum capacity for a barcode might be around 5 kilobytes=40 kilobits. While a key might be from 100 to 1000 bits. Hence a single barcode could wrap up to about 100 keys. It could be a preferred implementation that when Jane and Computer 100 interact, several such keys are made and shared. Because the manual proximity of Jane and Computer 100 can be inconvenient for her, so when she is in proximity, she and the computer store several keys.

This is advantageous, because it lets a given key be discarded for whatever reason, and an unused key to be used. For example, in many practical contexts, there could be a policy to only use a given key for a certain duration of time or for a certain number of conversations, for enhanced security.

One special case of the above is where Computer 100 is another person's cellphone or other mobile device. This could be for future usages where both devices are on the Internet. This includes the case where one or both has a temporary IP address, perhaps via an ISP that uses WiFi and DHCP. It also includes the case where one or both have a permanent IP address even though it is mobile. This could involve the use of IPv6, one of whose advantages over IPv4 is the ability for mobile devices to have permanent addresses.

Another usage is where the contents of a one time pad are transmitted via barcodes. In general, a valid one time pad is theoretically unbreakable. This invention lets 2 parties share a one time pad.

4. Library Lookup

There is a common situation in a library. A user wants to find a book. She might have information about the book, like its title and author, or its ISBN. She enters the library and finds a library computer. By entering her query, it tells her whether the library has the book or not. And if so, it tells the call number. For a large library, on several floors, or perhaps a library with several separate sublibraries, extra information could be furnished, like the floor or the sublibrary name. Sublibraries might exist if, say, the library is part of a large university with libraries associated with different departments.

If the book exists, she has to manually write down the call number and then use it to find the book. The manual effort is error prone and tedious. (Especially if she wants to find several books.) She now has to find that book, which can be daunting if she is a new or infrequent visitor to the library. If the library has many books, there are many stacks, and the arrangement of books on the stacks can be in an order which is confusing.

This invention involves the library first extending its database so that for a typical book, its location is also recorded. In general a spatial location has 3 coordinates, (x,y,z), where we can take z to be the vertical direction and x and y define a horizontal plane. In the context of this invention, they have different meanings. First, z can be considered a floor number. Possibly it can also have an index that designates a building code. Hence knowing z, (x,y) now represent the book's location in a given floor of a given building.

The library might replace (x,y) by a stack number, assuming that the stacks are numbered. Here, 'number' can also represent some alphanumeric label, if the stacks are labelled with digits and letters. In related ways, 'call number' is conventionally considered to be an alphanumeric label.

Also, by stack, this invention means a series of adjoining bookshelves. Often, a library might label such a stack with a number and also with a range of call numbers of the books held in that stack.

The library might choose to map each book into only the corresponding stack number. It could also include more precise location details for some (or most or all) books. Like the bookshelf within that stack, that has the book. Or, more precisely still, the shelf within that bookshelf, that has the book.

If the library stores its current data in a relational database, which is the norm for many large database applications, then the above can be understood by an expert in such databases, and implemented possibly as extra fields in the appropriate tables.

Next, the library needs to define a mapping from the previous position information to actual (x,y) location values on that floor.

It then needs to implement a routing algorithm that takes as input, for example, the location of a library computer when the user might enter her query.

This invention now assumes that the user has a cellphone, and that this has a camera and software that can take an image of a barcode and decode it. In general, at least for the QR code and possibly for other types of barcodes, arbitrary data can be encoded.

The user goes to a computer in the library and gives the particulars of the book. The computer replies and assumes that the book is available on a shelf. It tells her the call number. But it also displays a barcode with some formatted data. She uses her phone to take a photo of the barcode and then decode it.

The resulting data is now shown on her phone's display. It can be text that gives the call number, and also describes how to walk from that computer to the shelf with the book.

It can be seen that at the zero-th level, just having the call number in her phone is more convenient and less error prone than transcribing it from the computer screen.

The directions can let her easily walk to the book's location. This might include going out of her current building and into another building.

A variant is where the data includes an image—a map or maps. These draw a path from her current location to the book's location. There might be several maps, if the book is on a different floor or building.

The data could have directions in both textual and map formats.

It can be seen that the routing algorithm uses the information about the location of the library computer where the query is made, to define the starting point.

A variant is where the user is not in the library. She uses a browser to go to the library's website. In this case, there might be an option, where if the routing algorithm is told that the query is not from inside the library, to default to some starting location, like the library entrance (or the entrance of the sublibrary with the book). The user might be able to define another starting point on the query page.

This invention differs from the prior art in several ways. For example, some museums might loan to visitors a portable computer that can use location information wirelessly emitted by transmitters throughout the museum. Or the computer might have some inertial sensors that give it location information. The computer then shows audio or video about the items on display at different locations.

A related prior art is US Patent Application 20110178863. This uses wireless transmitters in a store that broadcast information about items to a customer's cellphone.

The methods in the previous 2 paragraphs require extra hardware in the business area frequented by the visitor. Our method does not need extra hardware.

Nor does it require that the user's location within the library be known, other than when she is at a library computer. The latter location can be hardwired as an input to the routing. This is also an advantage, because the problem of determining a user's location inside a building can be expensive. Chapter 9 of "Global Positioning" describes several methods, essentially all of which need equipment to be deployed in the building.

Our method is a low cost alternative.

A variant is where the user asks for the locations of several books. The routing algorithm can offer the option of finding a minimum (shortest) path, to the extent that this is computable. It might be that a locally minimum of path length could be found, instead of a global minimum.

Our method also differs from the prior art in displaying a customised barcode on a computer screen. In contrast to the current widespread use of a non-customised barcode on fixed media.

Another advantage of this invention is that the reading of the barcode by the user's cellphone is easy. The user is by the computer that displays the barcode. Hence manually positioning her cellphone's camera to focus on the barcode is straightforward.

Also, the proximity to the barcode means that a high resolution barcode can be used. In more general usages, the distance between the camera and the barcode, combined with the resolution of the camera might mean that lower resolution barcodes are needed. So for the case of a QR code, a single barcode might have up to 4 k of alphanumeric characters, or 2953 bytes of binary data. The latter might be germane for the case of an encoded map.

If larger data needs to be encoded, one possibility is to have 2 or more barcodes shown on the library computer. The user can then take images of each.

If only text is encoded, then only one barcode is likely to be needed. If a map (or maps) is used, then an effort could be made to produce simple maps. They might be in black and white, and of low enough resolution to show the user the route.

A variant is where the directions are given as text commands in some computer language or script. Suppose the user is in a motorised wheelchair that can understand and act upon those commands given in that format. Then when the user is at the library computer, there could be an option to let the output barcode contain those commands. The user can then use her phone to decode this and, by further assumption, there is a means by which she can transmit this from her phone to her wheelchair, which then carries them out.

A variant on the previous paragraph is where the user can walk, and has a heads up display with software that can decode the barcode. The software can then display to the user the decoded data, as text instructions or as a map.

5. Extensions

A variant of FIG. 1 is where Computer 100 is another person's mobile device, like a cellphone or laptop. Here, it is assumed that the device is able to encode and display a barcode, or play a sequence of several barcodes, on its screen. Given that many mobile devices can now play video, or at least display still images, this should not be a major restriction.

Here, Computer 100 might not be accessible on the Internet. Hence Jane might have no other choice but to use the steps in this invention to access the data on Computer 100, independent of any concerns about anonymity or privacy.

Note that even if Computer 100 can access (go out on) the Internet, it does not follow that it can be accessed from the Internet. Its ISP might restrict its usage to only outgoing connections.

I claim:

1. A method of using a computer and a cellphone having cellphone camera and a cellphone browser, the method comprising:
    combining data input by a user with internal data or external data from a network via a first computer to form a composite data to be transferred;
    determining a desired sizing of the composite data to be displayed;
    determining a number of barcode images required to encode the composite data based on a maximum size of the composite data that can be encoded into a barcode;
    encoding the composite data into one or more barcode images;
    providing the one or more barcode image on an electronic screen of the first computer, the first computer comprising a browser, the browser displaying the composite data, by using a plug-in of the browser, in a first webpage and displaying the one or more barcode images onto one or more pop-up windows or one or more webpages different than the first webpage;
    modifying a source code of the first webpage to comment out any tags corresponding to one or more files on the internet associated with the first webpage, wherein the modifying comprises applying custom labels in the enclosing comment tags of the source code of the first webpage via the plug-in;
    transferring the composite data from the first computer to the cellphone by having the user take one or more images of the one or more barcode image through the cellphone camera, wherein the first computer and the cellphone are not connected to each other through the internet or the network; and
    decoding, in the cellphone, the one or more images through a barcode decoding software, the barcode decoding software not being connected to the first computer through the internet or the network;
    detecting, via the cellphone browser, the custom labels in the enclosing comment tags;
    applying a blacklist or whitelist on the cellphone against the addresses of the files in the commented out tags;
    determining whether to uncomment the tags based on the results of applying the blacklist or whitelist.

2. The method of claim 1, further comprising:
    providing the first computer with a holder in which the cellphone is adapted to be placed, the holder aligning the cellphone camera to focus on the one or more barcode images.

3. The method of claim 1, wherein the composite data comprises audio files and image files.

4. The method of claim 3, wherein the image files comprise one or more maps with directions from a current location to a desired destination.

5. The method of claim 1, further comprising:
    encoding an entire source code of the first webpage shown in the browser via the plug-in.

6. The method of claim 1, further comprising:
    downloading image files referenced in the first webpage to the first computer, and encoding the image files as one or more barcode images via the plug-in, wherein, if a downloaded image file is greater than a set size, the downloaded image file is converted to a lower resolution image before being encoded as the one or more barcode images;
    modifying a copy of a source code of the first webpage to reference the image file as local, before providing the one or more barcode images via the plug-in; and
    displaying all the one or more barcode images in the one or more popup windows or the one or more webpages different than the first webpage via the plug-in.

7. The method of claim 1, further comprising:
    downloading an audio file;
    converting the audio file into the one or more barcode images; and
    modifying the source code of the first webpage to refer to the audio file as local.

8. The method of claim 1, further comprising:
    downloading an audio file; and
    running an automatic speech recognizer against the audio file to convert the audio file to text, the text being written into a source code of the first webpage, in place of the audio file, before the first webpage is encoded into the one or more barcode images.

9. The method of claim 1, wherein:
    the plug-in lets a user select a particular region of the first webpage so that the plug-in only encodes image files of that particular region into the one or more barcode images.

10. The method of claim 1, wherein:
    the plug-in only encodes material in a source of the first webpage that is delimited by a predetermined pair of tags.

11. The method of claim 1, wherein:
    if several barcode images of the one or more barcode images are to be shown at the same location, the user presses a hardware or software button on the first computer, to scroll through the display of the several barcode images.

12. The method of claim 1, wherein:
    the plug-in tests the first webpage for malware by displaying the first webpage in a virtual environment, and wherein, if the first webpage fails the tests, the first webpage is not encoded.

13. The method of claim 1, wherein:
    the plug-in rewrites the first webpage for optimal display on a cellphone, the rewriting including restricting maximum or minimum sizes of text, and restricting the types of fonts.

14. The method of claim 1, wherein:
    the first computer runs a browser that goes to a website;
    the user types a URL in a webpage on the website;
    the user notifies the website of the cellphone's browser, operating system and hardware; and the website gets the first webpage, and runs the first webpage in a virtual machine corresponding to the cellphone's browser, operating system and hardware.

15. The method of claim 14, wherein:
a browser of the virtual machine is modified to detect malware in a displayed page;
an operating system of the virtual machine runs a program that scrutinizes the browser of the virtual machine for error conditions;
hardware of the virtual machine runs a program that scrutinizes the operating system of the virtual machine for errors; and
an operating system of the computer runs a program that scrutinizes the hardware program of the virtual machine for errors.

16. The method of claim 1, wherein the composite data encoded into the one or more barcode images are keys to a symmetric cryptosystem or a one-time pad.

17. The method of claim 1, further comprising encoding an entire source code of the first webpage shown in the browser to be displayed as one or more barcode images on the first computer.

18. The method of claim 17, wherein the encoding is done by a third party, wherein the third party is a party other than the user and a party associated with the first webpage being accessed by the user.

19. The method of claim 1, wherein resolution of the one or more barcode images displayed on the first computer is adjustable.

20. The method of claim 1, wherein the more than one barcode images, encoded when the composite data is too large for a single barcode, have embedded frame numbers, wherein the embedded frame numbers are configured to track an order of transmission.

* * * * *